United States Patent Office 3,784,592
Patented Jan. 8, 1974

3,784,592
HALOGENATED POLYHYDROXY-CONTAINING PHOSPHATE ESTERS
Lewis R. Leonard, Alma, Mich., assignor to Michigan Chemical Corporation, St. Louis, Mich.
No Drawing. Filed Feb. 25, 1971, Ser. No. 118,936
Int. Cl. C07f 9/08; C08g 22/44
U.S. Cl. 260—953  3 Claims

ABSTRACT OF THE DISCLOSURE

There is disclosed certain esters of phosphoric acid represented by the formula:

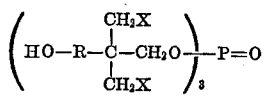

wherein R is a linear aliphatic hydrocarbon radical having 1–20 carbon atoms and wherein X is bromine or chlorine, preferably bromine. The use of such esters as reactive fire retardant agents for polymeric systems, especially urethane foams, is suggested; as is their use for other purposes such as light stabilizers for such systems.

---

The present invention relates to certain polyhydroxyl-containing esters of phosphoric acid, and to their use for providing polymeric compositions having increased resistance to burning, relating more particularly to polyurethane resin compositions which are appreciably more flame retardant than similar compositions produced by conventional methods.

Many additives used heretofore for rendering polymeric compositions flame retardant depend upon the incorporation of halogen and/or phosphorus into the polymeric system in order to be effective. Such additives are often characterized as reactive or non-reactive; that is, some are used together with the usual monomers or other reactants for producing the polymer, and enter into the reaction, usually becoming a part of the polymeric system. Others are physically blended with the polymeric resin during or after its formation to render it flame retardant. It has been found heretofore that for flame retardant purposes, bromine is generally more effective than chlorine, and that either bromine or chlorine appear to produce a synergistic effect when used with phosphorus in the same system.

The chemical products of the present invention provide a good source of halogen and of phosphorus for a number of polymeric systems, particularly if reactive additives are desired. These products are certain phosphoric acid esters which may be represented by the structural formula:

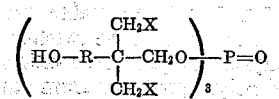

wherein R represents a linear aliphatic hydrocarbon radical having 1 to 20 carbon atoms and wherein X represents bromine or chlorine. It will be noted that the alkyl radicals which form a part of these phosphoric acid esters contain the neopentyl structure which, in general, may be represented as follows:

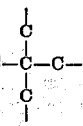

It is also evident that such phosphoric acid esters contain bromine or chlorine and each chain terminates in a hydroxyl group. Also, the halogen is present in the form of a halomethyl group, and preferably it is bromine. In fact, the preferred compounds for purposes of the present invention are:

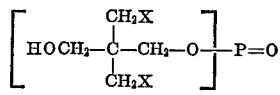

X=bromine or chlorine, preferably bromine and the particular compound of choice is tris[2,2-bis-(bromomethyl) 3-propanol] phosphate.

The phosphoric acid esters of the present invention may be produced by the reaction of the appropriate glycol or hydroxyl-containing compound with phosphorus oxychloride. For example dibromoneopentyl glycol may be reacted with phosphorus oxychloride to produce tris[2,2-bis(bromomethyl) 3-propanol] phosphate as illustrated by the following chemical equation:

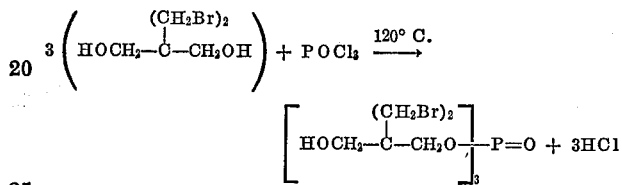

Of course other hydroxyl containing compounds may be employed to produce a longer chained alkyl radical if desired. Also, the tris[2,2-bis(bromomethyl) 3-propanol] phosphate compound mentioned above may be chain extended suitably after its production by reacting it with ethylene oxide, propylene oxide and the like in a manner well known in the art.

Within the general class of halogen and phosphorus-containing esters of phosphoric acid, a significant difference has been observed in the performance of specific compounds. Among the more important features to consider in this regard is the amount of compound used, and the ratio of halogen to phosphorus. This ratio is predetermined in the structure of the compounds of this invention, and amount appearing in the polymerized resin can be easily determined as well, so that both the ratio of halogen to phosphorus and the total amount of halogen contained in the system may be readily controlled. In order to be most effective, these compounds should start to decompose at the same or nearly the same temperature as the polymeric system they are used with, and decompose over the same temperature range as the polymer does; or as nearly so as possible. While the phosphoric acid esters of the present invention cannot have the characteristics most desirable for all the systems with which they might be used, as a rule they provide a relatively low thermal decomposition temperature and decompose at a rate making them useful for many polymers. For polyurethane resins, especially polyurethane foams, the additive should start to decompose at about 200° C. and rapidly decompose at about 200–250° C. and many of the compounds of the present invention are especially effective under these conditions.

It is of course important to use an amount of additive suitable to provide the desired halogen content in the polymerized resin. Usually this amount should not exceed about 20% by weight based on the polymer and as a rule about 10%–15% by weight is desirable. Too much of the additive can adversely affect important physical properties of the polymer and usually adds appreciably to the cost. Therefore whether or not the additive is reactive or nonreactive and despite the difficulty in obtaining reliable test results, it will be appreciated that selecting a particular additive for these polymeric systems provides a difficult problem requiring continued efforts to discover and develop better additives.

The following examples will serve to further illustrate the products of the present invention, but should not be construed as limiting.

EXAMPLE I

Preparation of tris[2,2-bis(bromomethyl) 3-propanol] phosphate 1965 grams of dibromoneopentyl glycol was charged into a 5 liter flask together with 892 grams of xylene (solvent) and 15 grams of anhydrous $MgCl_2$ (catalyst). The flask was fitted with a thermometer, condensor with Dean-Stark trap, stirrer, and dropping funnel. To the dropping funnel was added 380 grams of $POCl_3$.

The xylene was refluxed for one hour to dry the solution. The addition of the $POCl_3$ was then started and continued for four hours. After the completion of the $POCl_3$ addition, the reaction was continued for 24 hours at the end of which time no HCl was detected coming from the reaction. 10 ml. of water was then refluxed to remove any free acid from the product. A yield of 1660 grams of tris [2,2-bis(bromomethyl) 3-propanol] phosphate was obtained.

EXAMPLE II

Preparation of propoxylated tris[2,2-bis(bromomethyl) 3-propanol] phosphate

Half of the 1660 grams of tris[2,2-bis(bromomethyl) 3-propanol] phosphate produced as a result of the procedure of Example I was reacted with propylene oxide. 830 grams of this product were placed in a pressure reactor together with 2 grams of $TiCl_4$ (catalyst). At 100° C. and 80 p.s.i., 400 grams of propylene oxide was pumped in. Temperatures reached 165–170° C. When the addition was complete and the pressure had leveled off, the reaction vessel was placed under vacuum to remove volatiles.

The principal physical properties of the products of Examples I and II are provided in Table 1 below:

TABLE 1.—PHYSICAL PROPERTIES OF PRODUCTS OF EXAMPLES I AND II

|  | Unpropoxylated | Propoxylated |
| --- | --- | --- |
| Example | I | II |
| Hydroxyl number | 207.56 | 178.4 |
| Bromine content | 57.8 percent | 48.78 percent |
| Phosphorus content | 3.7 percent | 3.28 percent |
| Acid number | 1.0 | 1.0 |
| Viscosity | Waxy solid | 100,000+ centipoises |

EXAMPLE III

Preparation of flame retardant polyurethane foam 50 grams of tris[2,2-bis(bromomethyl) 3-propanol] phosphate (either propoxylated or unpropoxylated—Example I or II) and 50 grams of the commercial polyol "Voranol" RA 800 were weighed out and the resulting quantity of 100 grams of polyol were placed in a disposable container having a capacity of approximately one quart. To this polyol mixture was added 2.5 grams of a suitable silicone oil as a surfactant (DC–193) and 30 grams of a suitable blowing agent, in this case trichlorofluoromethane (Freon 11-B). These materials were stirred by a mechanical stirrer for approximately 5 seconds. 125 grams of the commercial isocyanate MRS were then weighed out into a smaller disposable container and poured into the solution during the mixing, which mixing was continued for an additional period of approximately 5 seconds. This mixing time was continued for as long as the reaction speed would allow but a total period of about 10 seconds was usually the maximum. The mixture was then poured into a suitable mold and allowed to rise. The resulting foamed polyurethane mass or "bun" rose to a height of about 8".

In Table 2 herein, some of the important physical properties of several polyurethane compositions, especially foams made in accordance with the present invention, have been provided. In some cases the compositions and physical properties of generally similar polyurethane foams not containing the present fire retarding additives have been provided for purposes of comparison. Standard tests commonly used in determining such physical properties were employed. The principal properties tested for were density, viscosity, compressive strength, humid aging, and oxygen index (a measure of fire retardancy).

The procedure of Example III was followed in preparing these compositions although the reactants and other materials referred to in Table 2 were used in the proportions set forth in this table. Suitable minor modifications in the process were, of course, made and if desired the process illustrated in Example III could be adapted by one skilled in the art.

All formulations were mixed using an air motor driving a 4" blade stirrer. The mixing time was for as long as the reaction speed would allow, generally approximately 10 seconds. The mixture was then poured into a mold and allowed to rise. The resulting bun was approximately 8" in height.

The compositions of Table 2 are provided in terms of parts by weight of the entire composition. The units for the various tests used to determined the physical properties are explained hereinafter in connection with the description of such test methods.

TABLE 2.—COMPOSITION AND PHYSICAL PROPERTIES—RIGID FOAM

|  | Sample 1 | Sample 2 | Sample 3 |
| --- | --- | --- | --- |
| Isocyanate Mondur [1] (MRS) | 100.0 | 125.0 | 125.0 |
| Polyol 632 | 100.0 |  |  |
| Polyol (Voranol [2] RA 800) |  | 50.0 | 50.0 |
| Product Example I (unpropoxylated) |  | 50.0 |  |
| Product of Example I (propoxylated) |  |  | 50.0 |
| Surfactant (Silicone DC–193) | 1.5 | 2.5 | 2.5 |
| Blowing agent (Freon 11B) | 22.0 | 30.0 | 30.0 |
| Water | 1.0 |  |  |
| Catalyst (TMEDA–100%) | 1.0 |  |  |
| Appearance | Good | Excellent | Excellent |
| Density | 1.96 | 2.00 | 2.03 |
| Oxygen index | 0.260 | 0.270 | 0.255 |
| Compressive strength, p.s.i. | 30 | 48 | 45 |
| Humid aging: |  |  |  |
| 1 day, percent | 5 | 4.13 | 5.71 |
| 7 days, percent | 6 | 5.30 | 6.48 |

[1] Trademark—Mobay Chemical Company, Pittsburgh, Pa., U.S.A.
[2] Trademark—Dow Chemical Company, Midland, Mich. U.S.A.

On occasion and especially in Table 2, trade names, trademarks or trade expressions have been referred to in connection with commercially available compounds which may be obtained and used for present purposes. These are defined immediately below.

"MRS" refers to polymethylene polyphenylisocyanate. For example the material sold under the trademark "Mondur" [1] may be used. This material is a well known isocyanate often used in the production of polyurethane compositions.

"Voranol" [2] RA 800 is an amine based tetrol type polyol believed to result from the reaction of an alkylene diamine and ethylene or propylene oxide. For example, the amine based polyol produced from reacting ethylenediamine and propylene oxide may be used in the methods of Example II or III. Its structure is

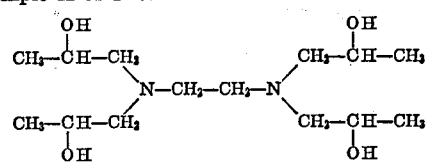

Various silicone type surfactants or silicone oils are well known for use as surfactants in the production of polyurethane resin compositions, especially foamed materials, and could be used for present purposes. For ex- ---
[1] Trademark, Mobay Chemical Company, Pittsburgh, Pa., U.S.A.
[2] Trademark, Dow Chemical Company, Midland, Mich., U.S.A.

ample, a polysiloxane glycolester may be utilized. A suitable commercial silicone oil which is satisfactory is the product known as "Surfactant DC-193," a product of Dow Corning Corporation, Midland, Mich., U.S.A.

The catalyst TMEDA referred to in Table 2 is a well known catalyst for polyurethane production, namely tetramethylethylenediamine.

"Freon 11-B" is the blowing agent trichlorofluoromethane.

"Polyol 632" is a reaction product of 2 mols of tetrabromophthalic anhydride and 0.5 mol of propoxylated sucrose. It contains very nearly 1.1 mols of propylene oxide per hydroxyl group. It is believed that this particular polyol is not a commercial product at present; but it is typical of a number of polyols which have been used in the production of polyurethanes. However, such polyols differ somewhat in their structure depending upon the particular producer. For details see U.S. 3,459,733.

The test methods for determining the physical properties referred to in Table 2 above, are standard methods in the industry, commonly used for determining the properties of polyurethane resin compositions. In these tests, "ASTM" refers to the tests as defined in the appropriate "Part" (volume)—American Society for Testing and Materials, 1916 Race Street, Philadelphia, Pa.

A summary of these tests follows:

Density—lb./cu. ft.

A foamed sample of measured volume was weighed and the density calculated according to the following equation:

$$D = \frac{M}{V} \times 62.4 \text{ lb./cu. ft.}$$

M=Mass in grams
V=Volume in cm.$^3$
62.4=conversion factor

It is preferable however to determine the density according to ASTM 1622 (Part 26, 1968, pages 164-165). Briefly this method is as follows: Five test specimens are pre-conditioned in a test room of enclosed space and are carefully weighed and measured. The density is calculated and the standard deviation estimated according to equations and procedures delineated in the test.

Oxygen Index—For units see formula below

The Oxygen Index is a measure of flammability. The index itself is defined as the minimal volume fraction of oxygen in a slowly rising gaseous atmosphere which will just sustain a candle-like burning of a stick of polymer. Thus the oxygen index, $$n = \frac{[O_2]}{[O_2] + [N_2]}$$

The larger the value of $n$, the more flame retardant the material tested. For more details, and the values of $n$ for a number of well known materials, see Fenimore and Martin, "Candle-Type Test for Flammability of Polymers," Modern Plastics, November 1966, published by McGraw-Hill Inc., 1301 Avenue of the Americas, New York, N.Y. An index of 0.26 to 0.27 would, generally speaking, indicate a material which is quite flame retardant and possibly self-extinguishing. Also see ASTM D-2863, Part 27, 1970, pages 719-722.

Compressive strength—p.s.i.

Generally speaking this test involves a procedure for applying a load to a specimen of predetermined size, employing a cross head motion; and dividing the maximum load in pounds by the area of the specimen in square inches—see ASTM D-1621, Part 26, 1968, pages 161-163.

Humid aging—percent change in volume

A 2" cube is cut from the sample and is subjected for a selected period of time to 100% relative humidity at 158° F. Results are determined by volume change (in terms of percent change) at the end of the time period set—see ASTM D-2126, Part 26, 1968, pages 488-492.

As discussed hereinbefore, the products of the present invention are particularly useful as flame retardant additives for solid plastic materials especially polyurethane resins and have found particular use in systems in which the additive needs to be especially resistant to discoloration, and the ill effects often resulting from heat. In fact, the compounds of the present invention not only are resistant to breakdown due to heat, but seem to have a stabilizing effect on many of the polymeric systems themselves. Although the reason for these results is not fully understood, it is believed that the unusual chemical structure of the neopentyl group forming an important part of these compounds provides a stabilizing effect against heat deterioration and possibly that caused by light as well, and particularly against the combined effect of heat and light.

Thus, in addition to their use as flame retardant additives for various polymeric systems, the compounds of the present invention show promise as additives to make such systems more resistant to the known ill effects of ultraviolet light, and are indicated for the treatment of certain textile materials especially in connection with the usual crease resistant materials to improve the characteristics of textiles while rendering them more flame retardant. Such results are particularly desirable in the treatment of fibers such as acrylic fibers used in carpets. Such compounds also show promise in the treatment of paper and other cellulose materials, not only to render them fire retardant but to operate as heat stabilizers, and to some extent as stabilizers against ultraviolet light.

What is claimed is:
1. A composition of matter represented by the structural formula:

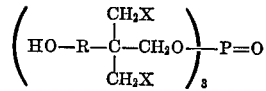

wherein R is an alkyl group having 1 to 20 carbon atoms and wherein X is bromine or chlorine.

2. A composition of matter acording to claim 1 in which R is CH$_2$.

3. A composition of matter according to claim 1 in which R is CH$_2$ and X is Br.

References Cited

UNITED STATES PATENTS 3,342,908   9/1967   Biram _____ 260—953

FOREIGN PATENTS 997,040   6/1965   Great Britain _____ 260—953

ANTON H. SUTTO, Primary Examiner

U.S. Cl. X.R.
260—2.5 AJ, 45.7 P